United States Patent Office 3,539,307
Patented Nov. 10, 1970

3,539,307
WELDING ROD
Anton Baumel, Goethestrasse 26, Lank,
(Lower Rhine), Germany
No Drawing. Filed Aug. 11, 1967, Ser. No. 659,862
Int. Cl. C22c 29/00
U.S. Cl. 29—182.8                                              6 Claims

ABSTRACT OF THE DISCLOSURE

A welding rod for making wear-resisting and corrosion-resisting hard facings. The rod consists of 10–90% tungsten carbide and 10–90% of a powder having the following ingredients: 0.1–4.0% carbon, 0.05–2.0% silicon, 0.05–2.0% manganese, 20–40% chromium, 0.1–20% nickel, an element selected from the class consisting of tungsten in amount of 2–20% and columbium in an amount of 2–15%, 0.3–6.0% copper, 0.1–10% molybdenum, 0.1–5% iron and the balance cobalt.

This invention relates to a welding rod which is usable in the making of wear-resisting and corrosion-resisting hard facings and which consists of a sintered powder mixture which contains tungsten carbide.

Welding rods which contain tungsten carbide and are used for making wear-resisting hard facings are known. Whereas the hard facings made with the known electrodes have satisfactory wearing properties, they do not withstand an attack by corrosive chemical substances.

It has now been found that hard facings which are wear-resisting as well as corrosion-resisting can be obtained with the aid of the welding rods according to the invention.

The welding rods according to the invention constitute a sintered powder mixture which contains tungsten carbide and consists of 10–90% by weight of tungsten carbide and 90–10% of a powder consisting of 0.1–4.0% carbon, 0.05–2.0% silicon, 0.05–2.0% manganese, 20–40% chromium, 0.1–20% nickel, 2–20% tungsten or 2–15% columbium, 0.3–6.0% copper, 0.1–10% molybdenum, 0.1–5% iron, balance cobalt. The powder proportion amounting to 90–10% by weight consists preferably of 0.8–2.5% carbon, 0.5–1.5% silicon, up to 0.5% manganese, 25–35% chromium, 5–15% nickel, 4–12% tungsten or 4–8% columbium, 1–3% copper, 2–4.5% molybdenum, up to 3% iron, balance cobalt.

The welding rods according to the invention and the facing which is deposited from them exhibit an increased resistance to the attack of chemical substances, as is apparent from Table 1, which gives a comparison of the weight losses of a known welding rod which contains tungsten carbide (No. 1) in boiling 20% sulfuric acid and boiling 10% hydrochloric acid and of the weight losses of welding rods according to the invention (Nos. 2–4).

TABLE 1

| Welding rod | Weight losses in grams per square meter hour | |
|---|---|---|
| | Boiling 20% H₂SO₄ | Boiling 10% HCl |
| 1 | 710 | 106 |
| 2 | 2.4 | 10.5 |
| 3 | 1.2 | 6.4 |
| 4 | 2.3 | 8.0 |

All welding rods listed in the table consisted of 50% tungsten carbide and 50% of an alloy having the composition given in Table 2 for each welding rod.

TABLE 2

| No. | 1 | 2 | 3 | 4 |
|---|---|---|---|---|
| Carbon | 1.20 | 1.15 | 1.90 | 1.90 |
| Silicon | 1.2 | 1.2 | 1.2 | 1.2 |
| Manganese | 0.12 | 0.15 | 0.20 | 0.20 |
| Chromium | 27.0 | 28.5 | 28.5 | 28.5 |
| Molybdenum | | 3.6 | 3.7 | 3.7 |
| Nickel | 1.2 | 6.5 | 6.5 | 6.5 |
| Tungsten | 4.5 | 4.5 | 10.0 | |
| Copper | | 1.6 | 1.6 | 1.6 |
| Iron | 1.8 | 1.8 | 1.8 | 1.8 |
| Columbium | | | | 5.5 |
| Cobalt | Balance | Balance | Balance | Balance |

The facings made from the investigated sintered electrodes have the same high resistance to corrosion as the electrodes themselves. The wear resistance of the facings made from the electrodes according to the invention was compared with known electrodes which contain tungsten carbide. For this comparison, the Balke method was used, in which the ratio of the abrasion of a faced specimen is compared with a certain steel specimen. When this ratio, which is described as the abrasion factor, is small, it indicates a high wear resistance. A high abrasion factor indicates a low wear resistance. The values are apparent from Table 3 and indicate that the welding rods according to the invention are equivalent to the previously known welding rods as far as the hardness and the abrasion factor of the hard facing are concerned.

TABLE 3.—HARDNESS AND BLAKE ABRASION FACTOR OF HARD-FACED SPECIMENS

| Welding rod | Rockwell C hardness | Abrasion factor |
|---|---|---|
| 1 | 66–68 | 0.25 |
| 2 | 64–66 | 0.20 |
| 3 | 64–68 | 0.22 |

It is apparent that the welding rods according to the invention are equivalent to corresponding known welding rods in hardness and wearing properties and are much superior to them in corrosion resistance. As all welding rods which have been compared give facings having approximately the same hardness, a significant difference in the susceptibility to cracking is not to be expected.

Although the invention has been illustrated and described with reference to one preferred embodiment thereof, it is understood that it is in no way limited to the details of such embodiment but is capable of numerous modifications within the scope of the appended claims.

What is claimed is:
1. A welding rod for making wear-resisting and corrosion-resisting hard facings,
   said welding rod consisting of a sintered powder mixture of 10–90% tungsten carbide and 10–90% of a powder consisting of
      0.1–4.0% carbon,
      0.05–2.0% silicon,
      0.05–2.0% manganese,
      20–40% chromium,
      0.1–20% nickel,
   an element selected from the class consisting of tungsten in an amount of 2–20% and columbium in an amount of 2–15%,
      0.3–6.0% copper,
      0.1–10% molybdenum,
      0.1–5% iron,
      balance cobalt.

2. A welding rod as set forth in claim 1, in which said powder consists of
- 0.8–2.5% carbon
- 0.5–1.5% silicon,
- traces to 0.5% manganese,
- 25–35% chromium,
- 5–15% nickel,
- an element selected from the class consisting of tungsten in an amount of 4–12% and columbium in an amount of 4–8%,
- 1–3% copper,
- 2–4.5% molybdenum,
- traces to 3% iron,
- balance cobalt.

3. A welding rod as set forth in claim 1, in which said powder contains 0.15–0.20% manganese.

4. A welding rod as set forth in claim 1, in which said powder contains approximately 3.6–3.7% molybdenum.

5. A welding rod as set forth in claim 1, in which said powder contains approximately 6.5% nickel.

6. A welding rod as set forth in claim 1, in which said powder contains approximately 1.6% copper.

References Cited

UNITED STATES PATENTS

| | | | |
|---|---|---|---|
| 3,329,487 | 7/1967 | Sowko | 29—182.8 X |
| 3,370,928 | 2/1968 | Fassler | 29—182.8 X |
| 3,403,009 | 9/1968 | Bergstrom | 29—182.8 X |
| 3,410,732 | 11/1968 | Smith | 29—182.8 X |

BENJAMIN R. PADGETT, Primary Examiner

A. J. STEINER, Assistant Examiner

U.S. Cl. X.R.

75—204